United States Patent Office 3,690,821
Patented Sept. 12, 1972

3,690,821
MANUFACTURE OF BORON TRIFLUORIDE
Robert A. Wiesboeck, Stone Mountain, Ga., assignor to United States Steel Corporation
No Drawing. Continuation-in-part of application Ser. No. 848,116, Aug. 6, 1969, which is a continuation-in-part of abandoned application Ser. No. 666,514, Sept. 8, 1967. This application Mar. 23, 1971, Ser. No. 127,334
Int. Cl. C01b 35/00
U.S. Cl. 423—293         7 Claims

ABSTRACT OF THE DISCLOSURE

An anhydrous oxo-salt of boron or boric oxide is mixed with an alkali or alkaline earth fluorosulfonate and heated, preferably in the range of about 100–200° C. to evolve boron trifluoride which is recovered as product.

---

This application is a continuation-in-part of application Ser. No. 848,116 filed Aug. 6, 1969 now abandoned, which in turn is a continuation-in-part of application Ser. No. 666,514 filed Sept. 8, 1967, now abandoned.

BACKGROUND

Conventional processes for the production of $BF_3$ are based on the reaction of sodium tetraborate (borax) with calcium fluoride and sulfuric acid or with hydrogen fluoride followed by treatment with fuming sulfuric acid. Other boron sources such as boric oxide, boric acid and the borate salts of ammonia, sodium or potassium have also been used. However, all such prior processes involved wet chemical reactions which require relatively complicated procedures and present corrosion problems. Also, because aqueous media are used in the wet chemical reactions, the abundant cheap insoluble natural occurring borates containing calcium could not be used.

SUMMARY

I have now developed a dry process for the preparation of boron trifluoride from materials containing oxo-salts of boron or boric oxide which lessens reactor corrosion and allows the use of cheap boron sources. My process comprises mixing an anhydrous oxo-salt of boron or boric oxide with an alkali or alkaline earth fluorosulfonate and heating to liberate the boron trifluoride.

DETAILED DESCRIPTION

The materials used in the process are alkali or alkaline earth fluorosulfonates and boric oxide and oxo-salts of boron. Although any one of the alkali or alkaline earth fluorosulfonates may be used, I prefer calcium fluorosulfonate since it maintains a dry free-flowing reaction bed resulting in higher yields and easier handling.

Any anhydrous oxo-salt of boron may be used as the boron source. Although primary interest is directed to obtaining boron trifluoride from inexpensive boron and oxygen containing materials, it should be understood that in its broad sense, my invention pertains to the reaction of any oxo-salt of boron with an alkali or alkaline earth fluorosulfonate. Boric oxide may also be used as the boron source.

The preferred boron sources are the minerals colemanite ($Ca_2B_6O_{11} \cdot 5H_2O$), ulexite ($NaCaB_5O_4 \cdot 8H_2O$), boracite ($Mg_7Cl_2B_{16}O_{30}$), borax ($Na_2B_4O_7 \cdot 10H_2O$), hambergite ($Be_2HBO_4$) and sassolite ($B(OH)_3$); and boric oxide. Especially preferred are colemanite, ulexite, borax, and boric oxide.

The physical condition of the reactions should preferably be such as to allow the solid-solid reaction to be completed within a reasonable time. Thus, I prefer to increase the rate of reaction by reducing the particle size of the reactants, preferably to −40 mesh size. A particle size of −200 mesh allows the completion of the reaction within one hour at 150–200° C.

The reaction between the borate and the fluorosulfonate salt such as calcium fluorosulfonate, sodium fluorosulfonate, or potassium fluorosulfonate begins on heating to about 50° C. and proceeds quite vigorously at 100–200° C. or higher up to 350° C. which is below the decomposition temperature of the fluorosulfonate.

The reaction may be carried out at sub-atmospheric, atmospheric or super-atmospheric pressures. The volatile products can be recovered by known commercial procedures. It is preferred to pressurize to about 2 to 10 atmospheres to minimize contamination of the product by entrainment of fine particles of the reaction bed.

It is preferred to use minerals with low silica content to avoid the posibility of forming silicon tetrafluoride which might contaminate the trifluoride. Other common impurities found in mineral boron sources do not affect the purity of the produced boron trifluoride.

The optimum ratio of fluorine to boron is three atoms of fluorine per atom of boron, but any imbalance will result not in product contamination, but simply in less efficient utilization of one or the other reactants.

The reaction is preferably carried out in an anhydrous atmosphere. A stream of dry nitrogen or air may, for example, be employed for excluding moisture.

To obtain the highest possible yield, it is preferred to heat the reactor to about 500° C. to drive off gases adsorbed on the spent reaction bed. The spent reaction bed is in finely divided solid form and can easily be removed.

The following examples show specific embodiments of the invention and as such, are not intended to be limiting.

Example I

Commercial anhydrous borax, which has the following composition, was employed in this and the following examples: $B_2O_3$, 68.9%; $Na_2O$, 30.7%; MgO, 0.08%; $SiO_2$, 0.1%.

An intimate mixture of the anhydrous borax (17.7 g., 0.088 mole) and calcium fluorosulfonate (126.0 g., 0.530 mole) is prepared by grinding the reactants together in a mortar. The mixture is transferred to a Teflon reactor and heated to 150° C. for three hours. Volatile reaction product is allowed to expand into an attached cold trap maintained at −196° C. After completion of the heating, the reactor is swept by a stream of nitrogen to move all volatile product into the trap. A total of 22.9 g. of boron trifluoride is obtained.

Example II

Boric oxide (6.9 g., 0.100 mole) and calcium fluorosulfonate (70.8 g., 0.300 mole) are mixed and reacted as described in Example I. After heating to 150° C. for three hours, 12.5 g. of boron trifluoride is collected.

Example III

A pulverized mixture of anhydrous borax (10.0 g., 0.050 mole) and calcium fluorosulfonate (70.8 g., 0.300 mole) is heated to 150° C. in a stainless steel cylinder for three hours. A pressure of approximately 120 p.s.i. develops. Subsequent venting into a cold trap (−196° C.) and pumping produces 13.1 g. of boron trifluoride.

Example IV

Anhydrous borax (10.0 g., 0.050 mole) and sodium fluorosulfonate (73.2 g., 0.600 mole) are treated as described in Example I. After heating to 200° C. for five hours, 9.6 g., of boron trifluoride is collected.

Example V

The process is carried out as described in Example IV except that potassium fluorosulfonate is substituted for sodium fluorosulfonate, 9.6 g. of boron trifluoride is collected.

Example VI

Anhydrous borax (20.0 g. 0.100 mole) and calcium fluorosulfonate (143.0 g., 0.6 mole) are mixed thoroughly by grinding the reactants together in a mortar under exclusion of moisture. The material is then transferred to a stainless steel reactor and heated to 350° C. in an electric furnace for one hour. The evolved volatile reaction product is allowed to expand into an attached cold trap immersed in liquid nitrogen (−190° C.) Residual gas is swept into the trap by a stream of nitrogen producing 24.8 g. boron trifluoride.

Example VII

A mixture of 20.0 g. (0.100 mole) of anhydrous borax and 200.0 g. (0.600 mole) of barium fluorosulfonate is treated as described in Example VI and heated to 350° C. for one hour producing 22.3 g. of boron trifluoride.

Example VIII

Colemanite ($Ca_2B_6O_{11} \cdot 5H_2O$) is dehydrated at 500° C., and 6.8 g. (0.120 mole boron) of the resulting material is mixed with 53.9 g. (0.340 mole) of calcium fluorosulfonate. The mixture is transferred into an aluminum cylinder, evacuated, and heated to 150° C. by an oil bath. A pressure of 140 p.s.i. develops within two hours. Venting of the gas into a receiving vessel produces 6.3 g. of boron trifluoride. The spent reaction bed contains 0.52% boron.

I claim:
1. A process for preparing boron trifluoride comprising:
   (a) mixing a solid finely divided anhydrous boron source selected from oxo-salts of boron and boric oxide with solid fluorosulfonate selected from alkali and alkaline earth fluorosulfonates; and
   (b) heating the solid mixture in the range of about 50–350° C. to evolve boron trifluoride.
2. The process of claim 1 wherein the oxo-salt of boron is dehydrated colemanite.
3. The process of claim 1 wherein the oxo-salt of boron is anhydrous borax.
4. The process of claim 1 wherein the fluorosulfonate is calcium fluorosulfonate.
5. The process of claim 1 wherein the heating is carried out in an anhydrous atmosphere.
6. The process of claim 2 wherein the solid mixture is heated to about 100–200° C.
7. The process of claim 1 wherein the oxo-salt of boron is borax, the fluorosulfonate is calcium fluorosulfonate and the solid mixture is heated to about 150–200° C.

References Cited

UNITED STATES PATENTS

| | | | |
|---|---|---|---|
| 1,865,204 | 6/1932 | Otto | 23—205 |
| 1,898,532 | 2/1933 | Hardtmann | 23—205 |

OTHER REFERENCES

E. L. Muetterties et al.: "Chemistry of Some Sulfur Oxyfluorides," J.A.C.S., vol. 80, 1958; pp. 5914–5918.

OSCAR R. VERTIZ, Primary Examiner

G. ALVARO, Assistant Examiner